(12) United States Patent
Spierling

(10) Patent No.: US 11,434,778 B2
(45) Date of Patent: Sep. 6, 2022

(54) INTEGRATED TAIL CONE AND MOUNTED GENERATOR ACOUSTIC SUPPRESSION

(71) Applicant: Hamilton Sundstrand Corporation, Charlotte, NC (US)

(72) Inventor: Todd A. Spierling, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 84 days.

(21) Appl. No.: 16/297,867

(22) Filed: Mar. 11, 2019

(65) Prior Publication Data
US 2020/0291809 A1 Sep. 17, 2020

(51) Int. Cl.
*F01D 15/10* (2006.01)
*F02C 7/045* (2006.01)

(52) U.S. Cl.
CPC ............. *F01D 15/10* (2013.01); *F02C 7/045* (2013.01); *F05D 2220/32* (2013.01); *F05D 2220/76* (2013.01); *F05D 2260/96* (2013.01)

(58) Field of Classification Search
None
See application file for complete search history.

(56) References Cited

U.S. PATENT DOCUMENTS

| | | | | |
|---|---|---|---|---|
| 4,100,993 A * | 7/1978 | Feder | ............ | G10K 11/172 181/213 |
| 4,137,992 A * | 2/1979 | Herman | ............ | F02K 1/827 181/213 |
| 4,240,519 A * | 12/1980 | Wynosky | ............ | F02K 1/827 181/213 |
| 5,782,082 A * | 7/1998 | Hogeboom | ............ | F02K 1/827 60/226.1 |
| 7,784,283 B2 * | 8/2010 | Yu | ............ | F02K 1/827 60/770 |
| 8,025,122 B2 * | 9/2011 | Gilcreest | ............ | F01N 1/083 181/213 |
| 8,307,945 B2 * | 11/2012 | Todorovic | ............ | F02K 1/44 181/213 |

(Continued)

FOREIGN PATENT DOCUMENTS

| | | |
|---|---|---|
| EP | 2597269 A2 | 5/2013 |
| EP | 3023601 A1 | 5/2016 |

(Continued)

OTHER PUBLICATIONS

The Extended European Search Report for Application No. 19210997.3-1007; Report dated Jun. 10, 2020; 9 pages.

(Continued)

*Primary Examiner* — Todd E Manahan
*Assistant Examiner* — Rodolphe Andre Chabreyrie
(74) *Attorney, Agent, or Firm* — Cantor Colburn LLP

(57) ABSTRACT

A gas turbine engine including: a tail cone; a low pressure compressor; a low pressure turbine; a low speed spool interconnecting the low pressure compressor and the low pressure turbine; and an electric generator located within the tail cone, the electric generator being operably connected to the low speed spool; and one or more acoustic panel assemblies located around the electric generator, the one or more acoustic panel assemblies including: an acoustic backing sheet, an outer porous liner, and an acoustic liner interposed between the outer porous liner and the acoustic backing sheet.

18 Claims, 3 Drawing Sheets

(56) References Cited

U.S. PATENT DOCUMENTS

| | | | |
|---|---|---|---|
| 8,479,877 B2* | 7/2013 | Todorovic | F02K 1/827 |
| | | | 181/213 |
| 8,776,946 B2* | 7/2014 | Todorovic | F02K 1/827 |
| | | | 181/213 |
| 9,284,063 B2* | 3/2016 | Himmelmann | B64D 41/007 |
| 9,917,490 B2* | 3/2018 | Lemmers | F02C 7/32 |
| 2004/0045765 A1* | 3/2004 | Porte | F02K 1/827 |
| | | | 181/210 |
| 2007/0265761 A1 | 11/2007 | Dooley | |
| 2013/0133336 A1* | 5/2013 | Barnett | F01D 25/164 |
| | | | 60/802 |
| 2013/0306403 A1 | 11/2013 | Todorovic | |
| 2016/0149469 A1* | 5/2016 | Lemmers | F01D 15/10 |
| | | | 290/1 A |
| 2020/0291890 A1 | 9/2020 | Spierling | |

FOREIGN PATENT DOCUMENTS

| | | | |
|---|---|---|---|
| EP | 3358174 A1 | 8/2018 | |
| EP | 3708789 A1 | 9/2020 | |
| GB | 2443743 A | 5/2008 | |

OTHER PUBLICATIONS

European Extended Search Report for European Application No. 19216184.2; Application Filing Date: Dec. 13, 2019; dated Jul. 27, 2020; 8 pages.
Non-Final Office Action for U.S. Appl. No. 16/354,357; Application Filing Date: Mar. 15, 2019; Notification dated Jul. 21, 2020; 21 pages.

* cited by examiner

INTEGRATED TAIL CONE AND MOUNTED GENERATOR ACOUSTIC SUPPRESSION

BACKGROUND

The subject matter disclosed herein generally relates to gas turbine engines, and more specifically to electrical generators for gas turbine engines.

Conventional gas turbine engines are often tight on free space due to envelope constraints. Therefore innovative space-saving designs and architectures are often sought out when integrating new components into the gas turbine engine.

BRIEF SUMMARY

According to one embodiment, a gas turbine engine is provided. The gas turbine engine including: a tail cone; a low pressure compressor; a low pressure turbine; a low speed spool interconnecting the low pressure compressor and the low pressure turbine; and an electric generator located within the tail cone, the electric generator being operably connected to the low speed spool; and one or more acoustic panel assemblies located around the electric generator, the one or more acoustic panel assemblies including: an acoustic backing sheet, an outer porous liner, and an acoustic liner interposed between the outer porous liner and the acoustic backing sheet.

In addition to one or more of the features described above, or as an alternative, further embodiments may include that the acoustic backing sheet is interposed between the electric generator and the acoustic liner.

In addition to one or more of the features described above, or as an alternative, further embodiments may include that the acoustic backing sheet and the acoustic liner are interposed between the electric generator and the outer porous liner.

In addition to one or more of the features described above, or as an alternative, further embodiments may include: a structural support housing at least partially enclosing the electric generator, the structural support housing being located within the tail cone; and a mounting system located within the tail cone between the structural support housing and the tail cone, wherein the mounting system attaches the tail cone to the structural support housing.

In addition to one or more of the features described above, or as an alternative, further embodiments may include that the tail cone is the outer porous liner.

In addition to one or more of the features described above, or as an alternative, further embodiments may include that the tail cone is composed of a ceramic matrix composite.

In addition to one or more of the features described above, or as an alternative, further embodiments may include that the tail cone is composed of a ceramic material.

In addition to one or more of the features described above, or as an alternative, further embodiments may include that the acoustic liner further includes: an inner side proximate the acoustic backing; an outer side opposite the inner side, the outer side being proximate the outer porous liner; and a plurality of side walls extending from the inner side to the outer side, wherein the plurality of side walls form chambers within the acoustic liner.

In addition to one or more of the features described above, or as an alternative, further embodiments may include a support structure of the gas turbine engine, wherein the structural support housing is attached to the support structure of the gas turbine engine.

In addition to one or more of the features described above, or as an alternative, further embodiments may include that the tail cone is secured to the support structure of the gas turbine engine partially or entirely through the structural support housing.

In addition to one or more of the features described above, or as an alternative, further embodiments may include that the tail cone is secured to the support structure of the gas turbine engine partially through the structural support housing and partially through a plurality of fasteners that attach the tail cone to the support structure.

According to another embodiment, an electric generation system for a gas turbine engine is provided. The electric generation system including: a tail cone; an electric generator located within the tail cone; and one or more acoustic panel assemblies located around the electric generator, the one or more acoustic panel assemblies including: an acoustic backing sheet, an outer porous liner, and an acoustic liner interposed between the outer porous liner and the acoustic backing sheet.

In addition to one or more of the features described above, or as an alternative, further embodiments may include that the acoustic backing sheet is interposed between the electric generator and the acoustic liner.

In addition to one or more of the features described above, or as an alternative, further embodiments may include that the acoustic backing sheet and the acoustic liner are interposed between the electric generator and the outer porous liner.

In addition to one or more of the features described above, or as an alternative, further embodiments may include: a structural support housing at least partially enclosing the electric generator, the structural support housing being located within the tail cone; and a mounting system located within the tail cone between the structural support housing and the tail cone, wherein the mounting system attaches the tail cone to the structural support housing.

In addition to one or more of the features described above, or as an alternative, further embodiments may include that the tail cone is the outer porous liner.

In addition to one or more of the features described above, or as an alternative, further embodiments may include that the tail cone is composed of a ceramic matrix composite.

In addition to one or more of the features described above, or as an alternative, further embodiments may include that the tail cone is composed of a ceramic material.

In addition to one or more of the features described above, or as an alternative, further embodiments may include that the acoustic liner further includes: an inner side proximate the acoustic backing; an outer side opposite the inner side, the outer side being proximate the outer porous liner; and a plurality of side walls extending from the inner side to the outer side, wherein the plurality of side walls form chambers within the acoustic liner.

In addition to one or more of the features described above, or as an alternative, further embodiments may include that the electric generator is configured to connect to a low speed spool of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

High pressure spools of gas turbine engines may be used to drive accessories of the gas turbine engine. However, as engine bypass ratios increase, the capability of a high pressure spool to drive accessories, such as electric generators, has been diminished. Therefore it is desirable to drive accessories off of a low pressure spool of the gas turbine engine. Gas turbine engines typically drive accessories through a radial tower shaft and accessory gearbox operably connected to the high pressure spool, however connecting to the low pressure spool is more challenging.

Gas turbines may also include a tail cone at the rear of the engine to help accelerate the exhaust flow and create additional thrust. The area surrounding the tail cone is often noisy and hot due to exhaust air exiting the gas turbine engine and flowing around the tail cone. The enclosed area within this tail cone is typically empty space, and is also adjacent to the rotating low pressure spool. Embodiments disclosed herein seek to take advantage of this empty space by locating an electric generator within the tail cone and operably connecting the electric generator to the low speed spool such that the electric generator is driven by the low speed spool. High temperatures and noise within the area of the tail cone complicate locating a generator within the tail cone and therefore embodiments disclosed herein also seek to address the challenges of locating the generator within the potentially high temperature and noisy environment of the tail cone.

Figure 1:
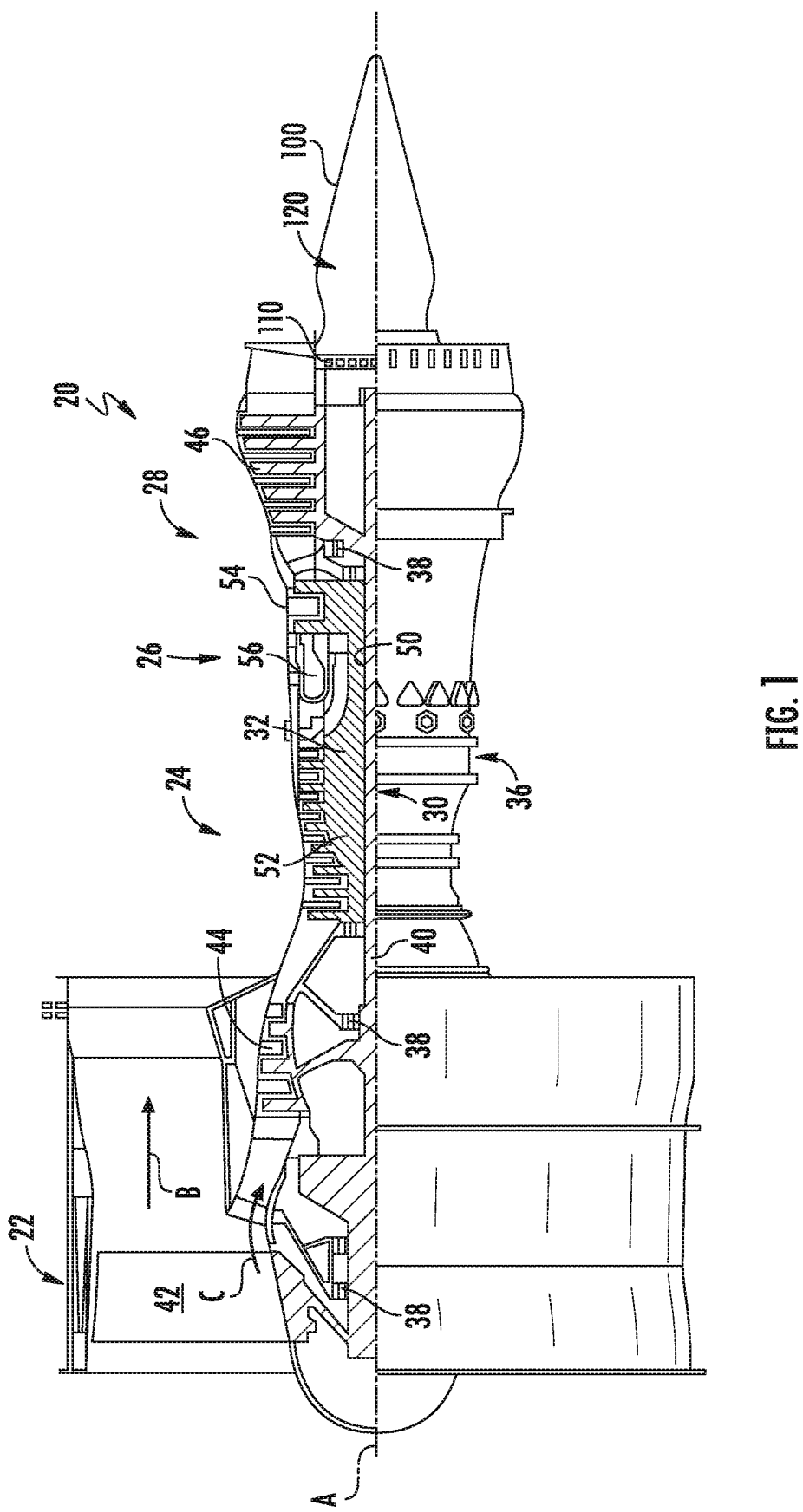
FIG. 1 is a partial cross-sectional illustration of an example gas turbine engine.

FIG. 1 schematically illustrates an example gas turbine engine 20 that may incorporate embodiments of the present disclosure. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The fan 42 may be driven at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbine section 28 rotationally drives the respective low speed spool 30 and high speed spool 32 in response to the expansion. It will be appreciated that each of the positions of the fan section 22, compressor section 24, combustor section 26, and turbine section 28, may be varied.

The engine 20 in one example is a high-bypass geared aircraft engine. In a further example, the engine 20 bypass ratio is greater than about six (6), with an example embodiment being greater than about ten (10). In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. A significant amount of thrust is provided by the bypass flow B due to the high bypass ratio.

The engine 20 includes a tail cone 100 located on a rear portion of the engine 20. The tail cone 100 is operably shaped to help accelerate the exhaust air flow exiting the core flow path C and create additional thrust for the engine 20. Commonly, the tail cone 100 may be securely fastened to the engine 20 via a plurality of fasteners 110 to a structural portion of the engine 20, however embodiments disclosed herein seek to provide an additional method to secure the tail cone 100 to the engine 20. The structural portion of the gas turbine engine 20 may be the engine static structure 36. The plurality of fasteners 110 may be arranged circumferentially around the engine central longitudinal axis A. The tail cone 100 may be securely fastened to the engine 20 in a cantilevered arrangement, as shown in FIG. 1. The tail cone 100 includes a hollow interior space 120 within the tail cone 100. Conventional gas turbine engines typically leave this interior space empty and unused, however embodiments disclosed herein seek to utilize this interior space 120 by locating an electric generator within the interior space 120, as discussed further herein.

Figure 2:
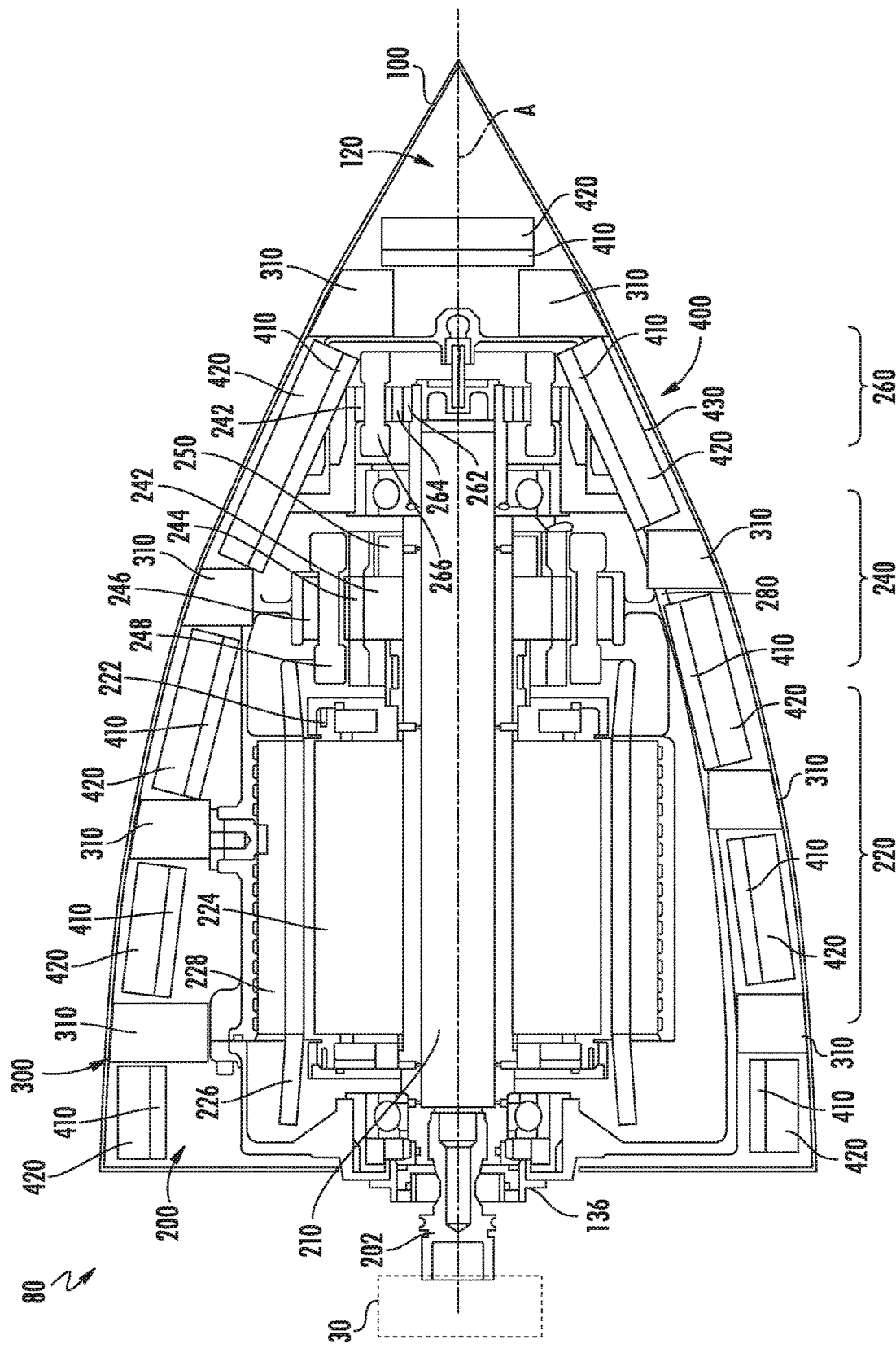
FIG. 2 is a cross-sectional illustration of an electric generation system for the gas turbine engine of FIG. 1, according to an embodiment of the present disclosure.

Referring now to FIG. 2, with continued reference to FIG. 1, a cross-section view of an electric generator 200 located within the interior space 120 of the tail cone 100 is illustrated, in accordance with an embodiment of the present disclosure. The combination of the electric generator 200 and the tail cone 100 may be considered an electric generation system 80 for the gas turbine engine 20 of FIG. 1. The electric generator 200 may be operably connected to the low speed spool 30 of the engine 20. A drive shaft coupling 202 may operably connect a shaft 210 of the electric generator 200 to the low speed spool 30 The low speed spool 30 is configured to rotate the shaft 210 of the electric generator 200 and the electric generator 200 is configured to generate electricity in response to the rotation of the shaft 210. The electricity generated by the electric generator 200 may be provided to the engine 20 and/or the aircraft to power various electrical devices.

The electric generator 200 may be a three-stage electrical generator that includes a main generator 220, an exciter generator 240, and a permanent magnet generator 260. It is understood that while a three-stage wound field synchronous electrical generator 200 is illustrated, the embodiments disclosed herein may be applied to other electrical generators including but not limited to a permanent magnet electrical generator, an induction electrical generator, a switched reluctance electrical generator, or any other electrical generator known to one of skill in the art.

The main generator 220, the exciter generator 240, and the permanent magnet generator 260 may each be brushless. The main generator 220 includes a main field winding 224 on a rotating portion 222 and a generator armature winding 228 of a stationary portion 226. The exciter generator 240 includes a rotating exciter armature winding 244 on a rotating portion 242 and an exciter winding 248 on a stationary portion 246. The permanent magnet generator 260 includes permanent magnets 264 employed on a rotating portion 262 and a winding 268 on a stator portion 266. The rotating portion 222 of the main generator 220, the rotating portion 242 of the exciter generator 240, and the rotating portion 262 of the permanent magnet generator 260 may each be operably connected to the shaft 210 of the electric generator 200 and configured to rotate with the shaft 210 around the engine central longitudinal axis A.

The rotation of permanent magnets 264 generates an alternating current voltage on windings 268 of the stator portion 266. The AC voltage provided by the permanent magnet generator 260 is rectified and selectively applied to an exciter winding 248 on a stationary portion 246 of the exciter generator 240. The exciter winding 248 generates a field that interacts with rotating exciter armature windings 244 on a rotating portion 242 of the exciter generator 240 to provide an AC voltage. A rotating rectifier assembly 250 rectifies the AC voltage and supplies the DC voltage to a main field winding 224 on the rotating portion 222 of the main generator 220. The rotating portion 522 may be operably connected to the low speed spool 30 through the shaft 210 and configured to rotate when the low speed spool 30 rotates. Rotation of the shaft 210 and the main field winding 224 induces three-phase AC output voltage on the generator armature winding 228 of the stationary portion 226 of the main generator 220.

The electric generator 200 is incased in a structural support housing 280 that provides structure support for the electric generator 200. The structural support housing 280 may be securely attached to a support structure 136 (e.g., the engine static structure 36) of the gas turbine engine 20. The structural support housing 280 may be securely fastened to the engine 20 in a cantilevered arrangement, as shown in FIG. 1. The structural support housing 280 may at least partially enclose the electric generator 200. The structural support housing 280 may fully enclose the electric generator 200 with the exception of the drive shaft coupling 202 extending through the structural support housing 280 to connect to the low speed spool 30.

In one embodiment, embodiment the tail cone 100 may be attached to the engine 20 partially through the structural support housing 280 and partially through the plurality of fasteners 110 (see FIG. 1). In another embodiment, the tail cone 100 may be secured to the engine 20 entirely through the structural support housing 280 and not through the plurality of fasteners 110 (see FIG. 1). Advantageously, by attaching the tail cone 100 to the gas turbine engine 20 through the structural support housing 280 the tail cone 100 may be made of different and/or thinner material because the tail cone 100 is no longer supporting its own structural load rather the structural support housing 280 acts as an internal frame to support the structural load of the tail cone 100. Commonly tail cones in conventional engines are composed of high strength and high temperature resistant metallic material, such as, for example, titanium or Inconel. By attaching the tail cone 100 to the gas turbine engine 20 through the structural support housing 280, the tail cone 100 may be composed of material such as, for example, ceramic matrix composite, or ceramic material. Ceramic matrix composite may not be as strong as titanium but provides additional high temperature protection over titanium and are lighter in weight than titanium.

The tail cone 100 may be attached to the structural support housing 280 through a mounting system 300 located between the tail cone 100 and the structural support housing 280. In an embodiment, the mounting system 300 may be a single structure interposed between the tail cone 100 and the structural support housing 280. In the embodiment shown in FIG. 2, the mounting system 300 may be composed of a plurality of mounts 310 attaching the tail cone 100 to the structural support housing 280. The plurality of mounts 310 may located at various different locations around the structural support housing 280 and not limited to the location shown in FIG. 2. The plurality of mounts 310 may form complete/uninterrupted rings around the structural support housing 280. The mounting system 300 may be integral to the structural support housing 280.

Figure 3:
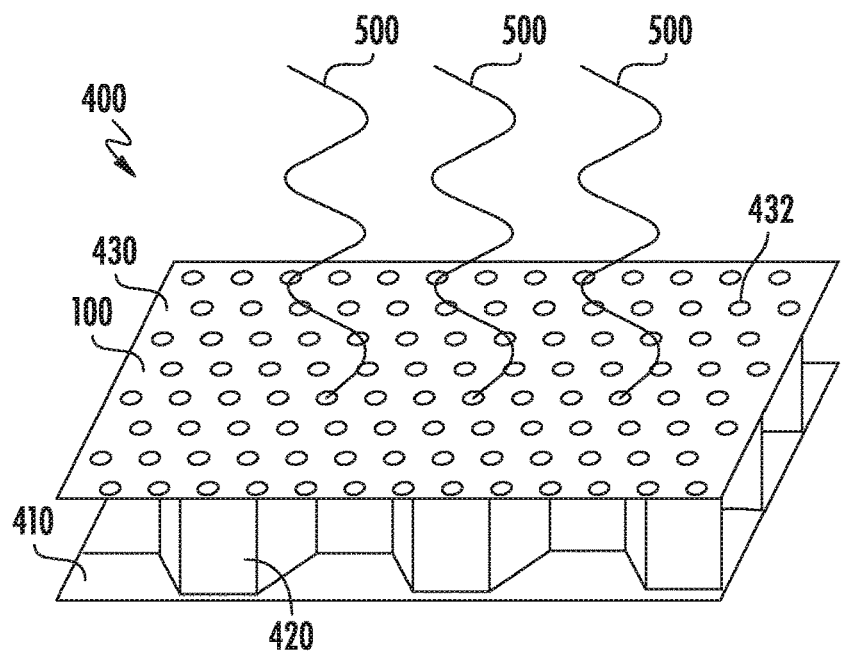
FIG. 3 is a an isometric view of an acoustic panel assembly for use in the electric generation system of FIG. 2, according to an embodiment of the present disclosure.
Figure 4:
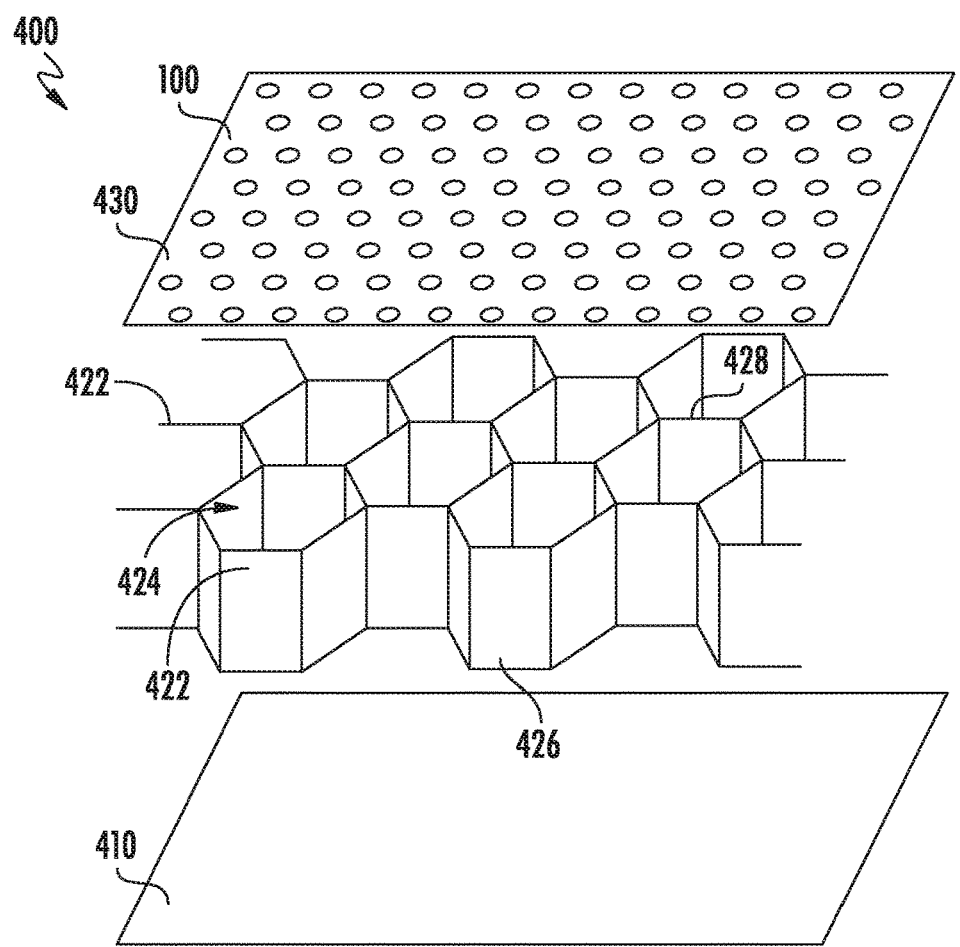
FIG. 4 is an exploded view of the acoustic panel assembly of FIG. 3, according to an embodiment of the present disclosure.

Referring now to FIGS. 2-4, with continued reference to FIG. 1, an acoustic panel assembly 400 in illustrated, in accordance with an embodiment of the present disclosure. There one or more acoustic panel assemblies 400 located around the electric generator 200, as shown in FIG. 2. The acoustic panel assemblies 400 may be interposed between the mounts 310 around the electric generator 200, as shown in FIG. 2. FIG. 3 illustrates an isometric view of the acoustic panel assembly 400 and FIG. 4 illustrates an exploded view of the acoustic panel assembly 400, in accordance with an embodiment of the present disclosure.

The acoustic panel assembly 400 is composed of an acoustic backing sheet 410, an acoustic liner 420, and an outer porous liner 430. The acoustic backing sheet 410, the acoustic liner 420, and the outer porous liner 430 are organized in layers, as shown in FIGS. 3 and 4. The acoustic backing sheet 410 may be the closest layer to the electric generator 200, as shown in FIG. 410. In an embodiment, the acoustic backing sheet 410 may be interposed between the electric generator 200 and the acoustic liner 420. In another embodiment, the acoustic backing sheet 410 and the acoustic liner 420 are interposed between the outer porous liner 430 and the electric generator 200. In the embodiment illustrated in FIGS. 2-4, the tail cone 100 is the outer porous liner 430. The outer porous liner 430 may include a plurality of openings 432 to allow sound waves 500 to travel through the openings 432 and into the acoustic panel assembly 400. As discussed previously, by attaching the tail cone 100 to the gas turbine engine 20 through the structural support housing 280, the tail cone 100 may be composed of material such as, for example, ceramic matrix composite, or ceramic material. The ceramic matrix composite or ceramic material composing the tail cone 100 may be porous to allow the sound waves 500 to pass through the tail cone 100 and into the into the acoustic panel assembly 400. In an embodiment the acoustic panel assembly 400 is integrally attached to the structural support housing 280.

Once the sound waves 500 to pass through the outer porous liner 430 and enter into the into the acoustic panel assembly 400 then the sound waves 500 enter into the acoustic liner 420 that is interposed between the acoustic backing sheet 410 and the outer porous liner 430. The acoustic liner 420 may include a plurality of chambers 424 formed by one or more side walls 422. In an embodiment, the chambers 424 are hexagonally shaped and formed by six side walls 422. It is understood however, that the chambers 424 may have any shape formed by any number of side walls 422.

The side walls 422 extend from an inner side 426 of the acoustic liner 420 to an outer side 428 of the acoustic liner 420. The inner side 426 is located opposite the outer side 428. The inner side 426 is located proximate the acoustic backing sheet 410 in the acoustic panel assembly 400 and the outer side 428 is located proximate the outer porous liner 430 in the acoustic panel assembly 400. In an embodiment, the side wall 422 are about perpendicular to the acoustic backing sheet 410 and the outer porous liner 430.

Once the sound waves 500 enter into the acoustic liner 420 the sound weaves 500 then travel through the chambers 424 and impact the acoustic backing sheet 410, which reduces the amplitude of the sound wave 500. The sound waves 500 may get trapped within the chambers 424 and reverberate within the chambers 424, which reduces the amplitude of the sound wave 500.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
   a tail cone having a cone-shaped portion;
   a low pressure compressor;
   a low pressure turbine;
   a low speed spool interconnecting the low pressure compressor and the low pressure turbine;
   an electric generator located within the cone-shaped portion the tail cone, the electric generator being operably connected to the low speed spool;
   one or more acoustic panel assemblies located around the electric generator in a cone shape, the one or more acoustic panel assemblies comprising: an acoustic backing sheet, an outer porous liner, an acoustic liner interposed between the outer porous liner and the acoustic backing sheet, and a plurality of side walls extending from the outer porous liner to the acoustic backing sheet, wherein the plurality of side walls form chambers within the acoustic liner;
   a structural support housing at least partially enclosing the electric generator, the structural support housing being located within the cone-shaped portion of the tail cone; and
   a mounting system located within the cone-shaped portion of the tail cone between the structural support housing and the cone-shaped portion of the tail cone, wherein the mounting system attaches the tail cone to the structural support housing,
   wherein the mounting system is composed of a plurality of mounts at multiple different locations along a length of the cone-shaped portion of the tail cone,
   wherein each of the plurality of mounts is a complete and uninterrupted ring around the structural support housing,
   wherein the one or more acoustic panel assemblies are interposed between the plurality of mounts around the electric generator,
   wherein the acoustic backing sheet is a solid and non-porous liner,
   wherein the acoustic backing sheet is configured to reduce an amplitude of a sound wave that travels through the chamber and impacts the backing sheet,
   wherein the acoustic backing sheet is configured to close off one side of the chamber, which traps the sound wave in the chamber and forces the sound wave to reverberate in the chamber,
   wherein the chamber has a hexagonal shape, and
   wherein the plurality of side walls include six side walls to form the hexagonal shape of the chamber.

2. The gas turbine engine of claim 1, wherein the acoustic backing sheet is interposed between the electric generator and the acoustic liner.

3. The gas turbine engine of claim 2, wherein the acoustic backing sheet and the acoustic liner are interposed between the electric generator and the outer porous liner.

4. The gas turbine engine of claim 1, wherein the tail cone is the outer porous liner.

5. The gas turbine engine of claim 4, wherein the tail cone is composed of a ceramic matrix composite.

6. The gas turbine engine of claim 4, wherein the tail cone is composed of a ceramic material.

7. The gas turbine engine of claim 1, wherein the structural support housing is attached to the support structure of the gas turbine engine.

8. The gas turbine engine of claim 7, wherein the tail cone is secured to the support structure of the gas turbine engine entirely through the structural support housing.

9. The gas turbine engine of claim 7, wherein the tail cone is secured to the support structure of the gas turbine engine through the structural support housing and through a plurality of fasteners that attach the tail cone to the support structure.

10. An electric generation system for a gas turbine engine, the electric generation system comprising:
a tail cone having a cone-shaped portion;
an electric generator located within the cone-shaped portion of the tail cone;
one or more acoustic panel assemblies located around the electric generator in a cone shape, the one or more acoustic panel assemblies comprising: an acoustic backing sheet, an outer porous liner, an acoustic liner interposed between the outer porous liner and the acoustic backing sheet, and a plurality of side walls extending from the outer porous liner to the acoustic backing sheet, wherein the plurality of side walls form chambers within the acoustic liner;
a structural support housing at least partially enclosing the electric generator, the structural support housing being located within the cone-shaped portion of the tail cone; and
a mounting system located within the cone-shaped portion of the tail cone between the structural support housing and the tail cone, wherein the mounting system attaches the tail cone to the structural support housing,
wherein the mounting system is composed of a plurality of mounts at multiple different locations along a length of the cone-shaped portion of the tail cone,
wherein each of the plurality of mounts is a complete and uninterrupted ring around the structural support housing,
wherein the one or more acoustic panel assemblies are interposed between the plurality of mounts around the electric generator,
wherein the acoustic backing sheet is a solid and non-porous liner,
wherein the acoustic backing sheet is configured to reduce an amplitude of a sound wave that travels through the chamber and impacts the backing sheet,
wherein the acoustic backing sheet is configured to close off one side of the chamber, which traps the sound wave in the chamber and forces the sound wave to reverberate in the chamber,
wherein the chamber has a hexagonal shape, and
wherein the plurality of side walls include six side walls to form the hexagonal shape of the chamber.

11. The electric generation system of claim 10, wherein the acoustic backing sheet is interposed between the electric generator and the acoustic liner.

12. The electric generation system of claim 11, wherein the acoustic backing sheet and the acoustic liner are interposed between the electric generator and the outer porous liner.

13. The electric generation system of claim 10, wherein the tail cone is the outer porous liner.

14. The electric generation system of claim 13, wherein the tail cone is composed of a ceramic matrix composite.

15. The electric generation system of claim 13, wherein the tail cone is composed of a ceramic material.

16. The electric generation system of claim 10, wherein the electric generator is configured to connect to a low speed spool of the gas turbine engine.

17. The electric generation system of claim 10, wherein the outer porous liner includes a plurality of openings, wherein each of the plurality of openings are circular in shape.

18. The gas turbine engine of claim 1, wherein the outer porous liner includes a plurality of openings, wherein each of the plurality of openings are circular in shape.

* * * * *